United States Patent Office 3,513,714
Patented May 26, 1970

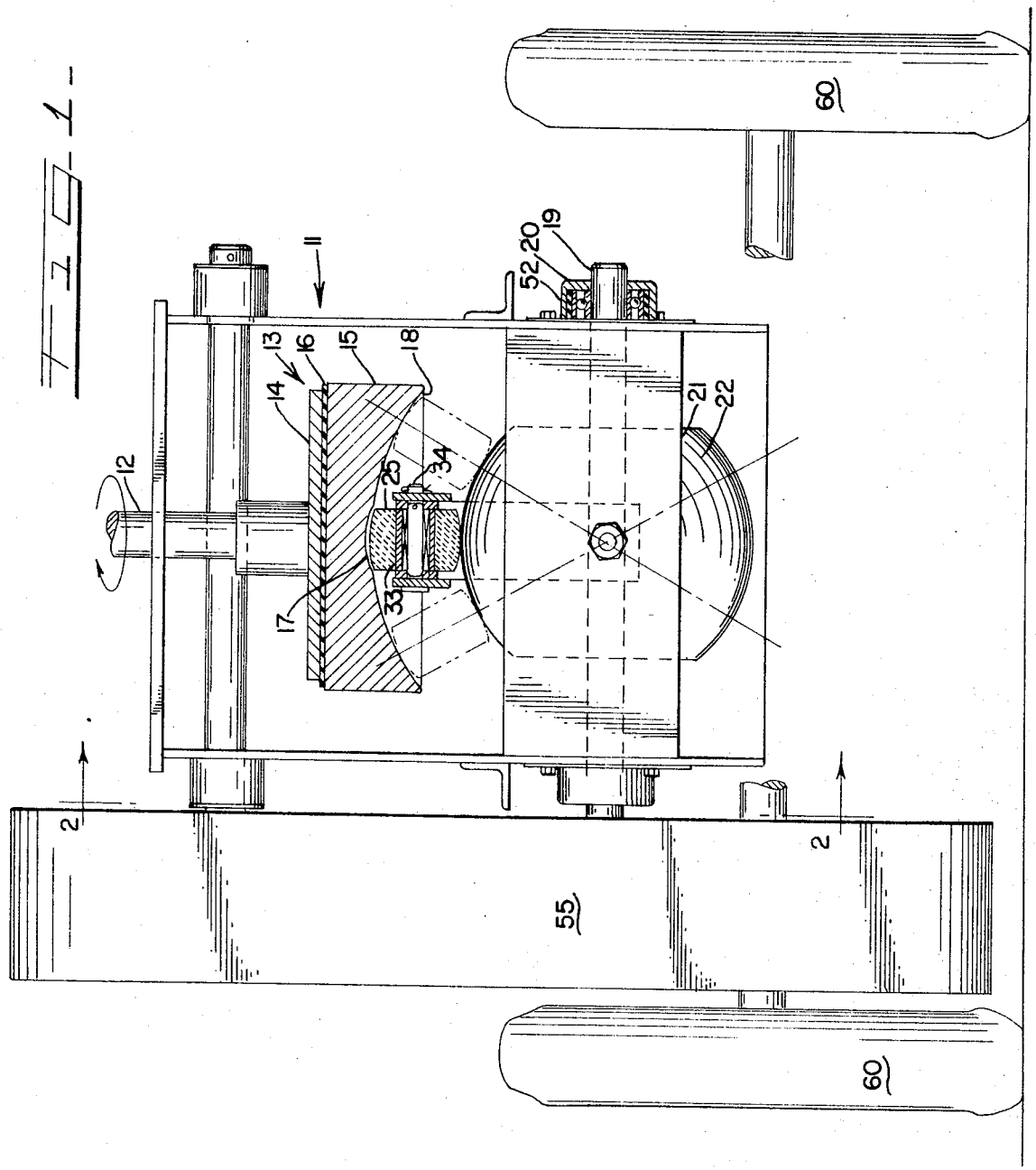

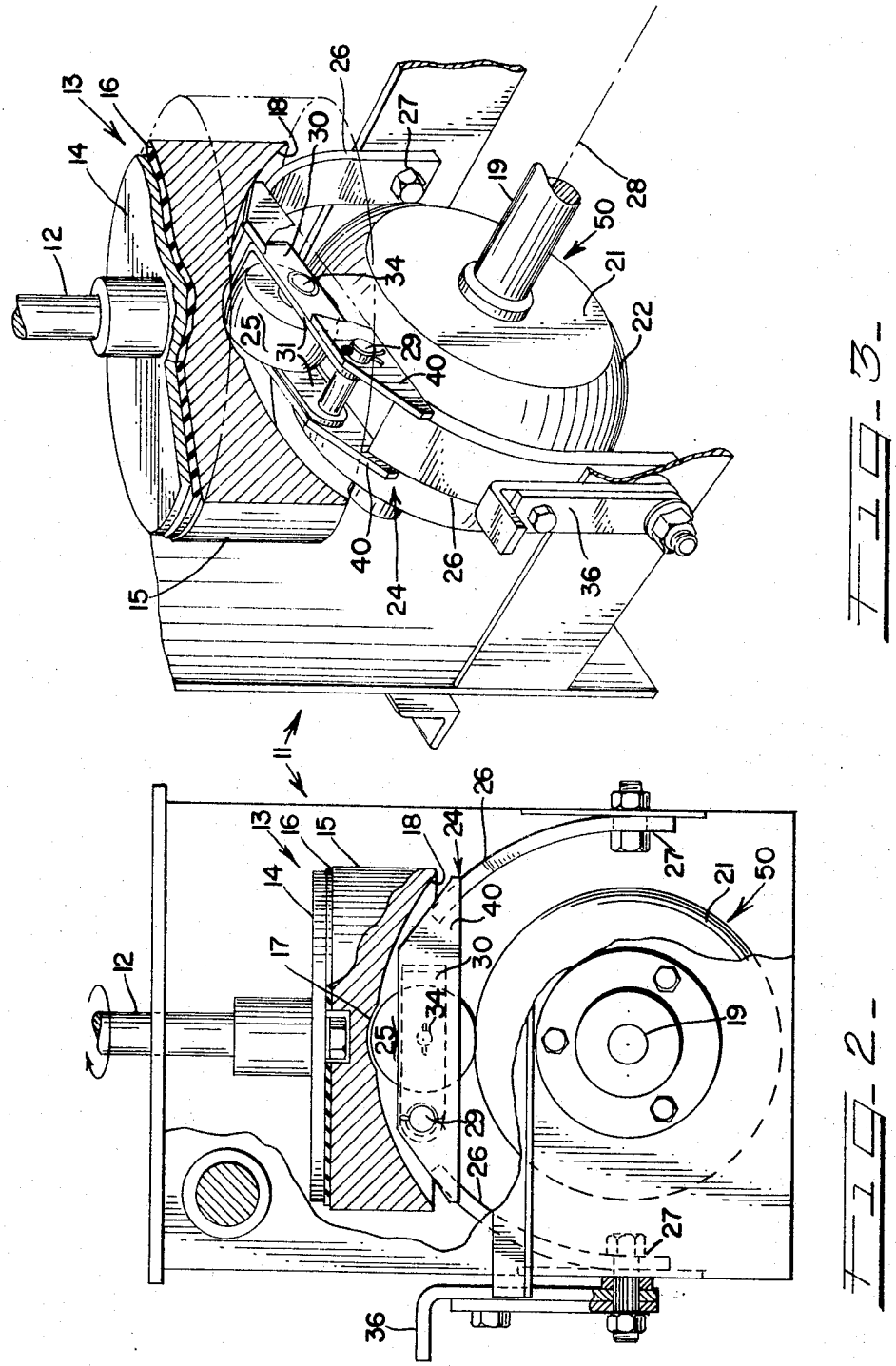

3,513,714
VARIABLE SPEED DRIVE ASSEMBLY
Marvin D. Jennings, Naperville, and Leonard A. Bettin, Lyons, Ill., assignors to International Harvester Company, Chicago, Ill., a corporation of Delaware
Filed Feb. 2, 1968, Ser. No. 702,637
Int. Cl. F16h 15/26
U.S. Cl. 74—198                    5 Claims

ABSTRACT OF THE DISCLOSURE

A variable speed friction drive assembly having a self-adjusting idler wheel interposed between concave-convex spherical surfaces of driving and driven elements, the idler wheel being mounted on supporting arms which may be rotated to various positions along the concave-convex surfaces to obtain variable speed.

BACKGROUND OF THE INVENTION

This invention relates to a reversible frictional drive assembly in which the angular velocity of a disk mounted on a driving shaft is transmitted to a second driven shaft by an idler interposed between the disk and the shaft, the idler being translatable to various radii of the disk to obtain variable speeds. The prior art discloses frictional drives in which a complex clutch mechanism is utilized to disengage the idler from the disk so as to translate the idler to various radii along the disk surface thereby obtaining variable speeds. Further disadvantages arise from the prior art devices in that the idler wheel is often rigidly held in a fixed position which does not permit equal frictional contact between the surfaces of the driving and driven elements and does not compensate for unequal wear on the frictional surfaces. Another problem arises from the inability of the prior art devices to absorb shock and vibrations and to inhibit the generation of sound and noise.

SUMMARY OF THE INVENTION

Our invention is a novel combination of elements designed to cope with the problems mentioned above. The device comprises a housing having input and output shafts, the input shaft having a driving head which imparts rotional motion to an idler wheel which in turn drives a convex shaped spherical member mounted on the output shaft. The idler is supported by an arcuate yoke which extends between the spherical member and the driving head and may be rotated about an axis of the spherical member so as to produce variable speeds in either angular direction. The supporting yoke is further provided with a compensating member which secures the idler in such manner as to permit equal frictional engagement on both the input and output frictional surfaces. Additionally, novel shock absorbing means are provided.

It is therefore an object of this invention to provide an economical variable speed drive assembly with the ability to deliver infinitely variable speeds to an output shaft while the input shaft or engine drive remains at a constant r.p.m. This is necessary where other devices are also driven off of the drive shaft and need this constant r.p.m. to function to their maximum efficiency. Another object of the invention is to provide a novel frictional drive combination which is simple in design, which is easy to maintain and which produces a minimum of noise and vibrational effect. Another object is to provide a device of the class described in which the effects of uneven wear and deterioration of the frictional surfaces are minimized. A further object is to provide a variable speed drive element in which the variation of speed is accomplished by a very simple unidirectional mechanism.

DESCRIPTION OF THE DRAWINGS

The manner in which the objects of the invention is obtained will be made clear by a consideration of the following specification and claims when taken in conjunction with the accompanying drawings in which:

FIG. 1 is a rear elevation view partially in cross-section illustrating the drive assembly in association with a motor vehicle;

FIG. 2 is a side elevation view of the drive assembly partially in cross-section, portions of the housing being broken away to show the interior mechanism; and FIG. 3 is a perspective view of the drive assembly partially in cross-section.

DESCRIPTION OF THE PREFERRED EMBODIMENT

A preferred embodiment of our invention as illustrated in the drawings discloses a drive assembly having a housing or frame 11 which will support and maintain the position of the various component parts. Entering into the housing at one end is a first shaft 12 which may be designated as a driving shaft or power input shaft. Within the housing a driving head 13 is joined to the power input shaft. The driving head 13 comprises a disk-like element 14, and a disk member 15 having a resilient member 16 interposed between these elements which absorbs shock and vibration and permits a gradual loading of force on the input drive. The disk-like element 14 may take the form of a cylindrical plate which is attached to the input shaft by conventional means such as by welding or a bolt connection. This disk-like member serves as a carrier for disk member 15, said disk member having a flat surface adjacent the cylindrical plate 14 and a concave spherical surface 18 for engagement with an idler wheel 25 and a deeper recessed portion or indentation 17 for a purpose hereinafter to be explained.

The resilient element 16 which is interposed between the cylindrical plate 14 and the disk member 15 may consist of a thin rubber material having transverse dimensions equivalent to the cylindrical plate 14 and the disk member 15. These three elements may be bonded together by conventional adhesives such as an epoxy resin to comprise the driving head. This shock absorbing quality of the driving head may also be accomplished by various other means. For example an annular tubular element of resilient material might be interposed between cylindrical plate 14 and the disk member 15 with bolts drawing these members together.

The output assembly 50 comprises a second shaft 19 having an axis perpendicular to the input shaft and may be designated as a power output shaft or the driven shaft. This shaft is mounted on opposite sides of the housing by bearings 20, which are in turn surrounded by a resilient material 52 carried by apertures in the housing. Within the housing spherical member 21 is fixedly attached to the driven shaft. This spherical member presents an arcuate or convex surface 22 which generally corresponds with the concave spherical surface 18 of the disk member 15. The surface 22 may be cylindrical, spherical or spheroidal so long as it corresponds with the surface design of the disk member 15. However, as the curvature of these surfaces increase, a greater variation in velocity may be obtained for a shorter transverse dimension of the driving head 13 and driven shaft 19. Outside the housing and attached to the driven shaft are drive elements (not shown) forming a part of a chain sprocket reduction assembly within a housing 55 to drive the wheels 60 of a vehicle. This sprocket reduction assembly forms no part of the present invention.

Interposed between the concave-convex surfaces of the disk member 15 and the spherical member 21 is a yoke assembly 24 carrying an idler wheel 25. The yoke assembly comprises two arcuate yoke members 26, 26 or supporting arms which are attached to opposite sides of the housing 11 by pivotable connections 27, 27 which may consist of bolts. The supporting arms are then connected together by rigid link elements 40, 40. Alternatively, the yoke assembly may consist of a semi-circular element having an elongated aperture near its center. The axis of the supporting arms passing through the pivotal connections 27, 27 is perpendicular both to the driving and driven shafts. Attached to these rigid link elements 40, 40 near one end by a second pivotal connection 29 is a bracket 30 which has limited angular rotation through link elements 40, 40 in a plane parallel to the supporting arms. The bracket 30 may consist of flange elements 31, 31 (see FIG. 2) having aperture (unnumbered) for supporting a shaft 34 (see FIG. 1) which carries the idle wheel 25 mounted thereon by bearing 33. By this arrangement, it will be observed that the idler wheel is free to adjust its position so as to bear against convex surface 22 and concave surface 18 with equal force with no transverse force acting upon the shaft 34 or bearing 33. The idler wheel has a thickness not exceeding the transverse dimension of the recess 17 of the disk member 15 for a purpose hereinafter to be explained.

By positioning the yoke assembly and the idler wheel at different radii of the disk member both the direction and speed of the driven shaft 19 may be determined even though the angular velocity of the power input shaft 12 remains constant. The positioning of the yoke assembly is accomplished by means of a lever 36 which is coupled to the yoke assembly 24 by a splined bolt 27 or other conventional means. Variable speeds of the device may be obtained by merely rotating the lever 36 in either direction along arcuate path (as indicated in FIG. 3). As the lever 36 is moved along this path the yoke assembly and idler wheel are consequently caused to move to various radii of the disk member 15. The angular velocity of the idler wheel 25 will be determined by the radial distance of the contact point between the idler wheel and the disk member from the center of the disk member and as the idler wheel is positioned towards the extreme radii of the disk member the idler wheel is given a greater angular velocity and such greater velocity is consequently transferred to the spherical member 21 which is in turn transferred to the shaft 22 and then to the chain sprocket reduction assembly. A centering spring (not shown) may be utilized to normally urge the idler wheel 25 to the central part of disk member 15 thereby positioning the idler wheel 25 within the recess portion of the disk member.

The preferred materials for the frictional surface of the idler wheel 25 is a ceramic material since such will withstand higher temperatures which may be generated by the friction developed. Further, we have found that if the spherical member 21 is made of rubber or somewhat resilient material the noise and vibrations of the interacting members may be dampened and yet preserve the torque produced by the driven shaft.

MODE OF OPERATION

Referring again to the drawings it will be observed that when the input shaft 12 is rotated as indicated in FIG. 1, the idler wheel 25 will be rotated in a direction determined by its point of engagement with the disk member 15 and the spherical member 21 and shaft 19 will be rotated in an opposite direction. Consequently, when the power source is delivering constant angular velocity to the driving shaft as indicated in FIG. 1, the operator may merely rotate the yoke lever to the right to obtain a forward movement of the vehicle. As the idler wheel leaves recessed portion 17 it frictionally engages surface 18 and is rotated counterclockwise (viewing from the right), and the cylindrical member 21 is rotated clockwise, giving the motor vehicle a forward movement. As the idler wheel is moved farther to the right, its point of contact with surface 18 is at a greater radius of disk member 15 which has a greater angular velocity and the vehicle is given a greater forward velocity. Alternatively, when the yoke lever is rotated to the left the vehicle moves rearwardly. When the yoke is in the center position the idler wheel is centered within the indented portion 17 of the disk member 15 and there is no frictional engagement between the idler wheel 25 and the disk member 15 and the drive assembly is in the neutral position. The pivotable connection 29 permits an angular movement of the bracket 30 whereby the idler wheel 25 engages the frictional surfaces of both the disk 15 and the cylindrical member 21 with equal force. Further it is evident that by moving the lever 36 in small increments, variable forward or reverse angular velocities of the output shaft 19 are obtained even though the angular velocity of the input shaft remains constant. Due to the selection of the materials of the drive elements and the employment of the resilient mountings, the noise and vibration otherwise produced is minimized. Further it is to be noted that the concave-convex shape of disk member 15 and the spherical member 21 allows a greater variation of speed than flat surfaces would permit for disk members of the same transverse dimensions. Finally, one can observe that the direction and velocity of the output drive shaft is determined by a simple, unidirectional movement along an arc corresponding with the curvature of the supporting arms, and the requirement of a complex clutching element is avoided.

The invention may be embodied in several forms without departing from the spirit or essential characteristics thereof. The present embodiment is illustrative and not restrictive and since the scope of the invention is defined by the appended claims all changes that fall within the needs and bounds of the claims or that form their functional as well as conjointly cooperative equivalents are therefore intended to be embraced by those claims.

We claim:
1. A reversible, variable speed drive assembly comprising:
   (a) A housing,
   (b) A first shaft extending into said housing,
   (c) A disk member having one side attached to the first shaft and the other side having a concave surface, a resilient material being interposed between said disk member and said first shaft for absorbing shock and vibrations,
   (d) A second shaft extending through said housing having spherical surface within the housing whose longitudinal axis is perpendicular to the longitudinal axis of said first shaft and carried by said housing,
   (e) An arcuate yoke assembly attached to said housing by hinge mountings so as to extend between said disk member and said spherical surface, and
   (f) An idler wheel carried by said yoke member presenting a surface which engages the surfaces of said disk member and said shaft, whereby angular velocity of said first shaft may be transferred to said second shaft.

2. A device as defined in claim 1 in which,
   (a) The concave surface of said disk member is provided with an indentation near its center whereby the idler wheel may be taken out of contact with said disk and no angular velocity is delivered to said second shaft.

3. A device as defined in claim 1 in which the means for rotating said yoke comprises,
   (a) A lever arm attached to said yoke and extending outward of said housing.

4. A device in claim 1 in which,
   (a) The yoke assembly has an elongated aperture, and
   (b) A bracket member pivotably mounted in said aperture which carries said idler wheel.

5. A reversible, variable speed drive assembly comprising:
   (a) A housing, (b) A driving shaft extending into said housing having a circular plate attached thereto, (c) A disk member having one side attached to said circular plate and the other side having a concave spherical surface with an interruption near the center forming a second indented surface, (d) A driven shaft extending through and supported by said housing, said second shaft having an axis perpendicular to the axis of said driving shaft, (e) A spherical member mounted on said shaft having a convex outer surface, (f) Two supporting arms extending between the concave-convex surfaces of the disk member and the spherical member, (g) Mounting means for attaching said supporting arms to opposite sides of said housing whereby said arms may be rotated to different radii of the concave-convex surfaces, (h) A bracket member extending between said supporting arms, (i) Means attaching said bracket member to one of the supporting arms whereby said bracket may rotate around an axis perpendicular to the axis of rotation of said supporting arms, and link elements joining the supporting arms, (j) An idler wheel mounted within said bracket said wheel having a circumferential surface engaging the surfaces of said disk and said spherical member, and (k) Means for rotating the supporting arms, the bracket and the idler wheel to different radii of the convex-concave surfaces whereby variable speeds and reversible drive may be obtained from said driven shaft.

References Cited

FOREIGN PATENTS 394,334  11/1908  France.
538,810  1/1956  Italy.

JAMES A. WONG, Primary Examiner

U.S. Cl. X.R.

74—200